(No Model.) 2 Sheets—Sheet 1.
J. F. TALLANT.
STEAM COOKER.
No. 512,339. Patented Jan. 9, 1894.
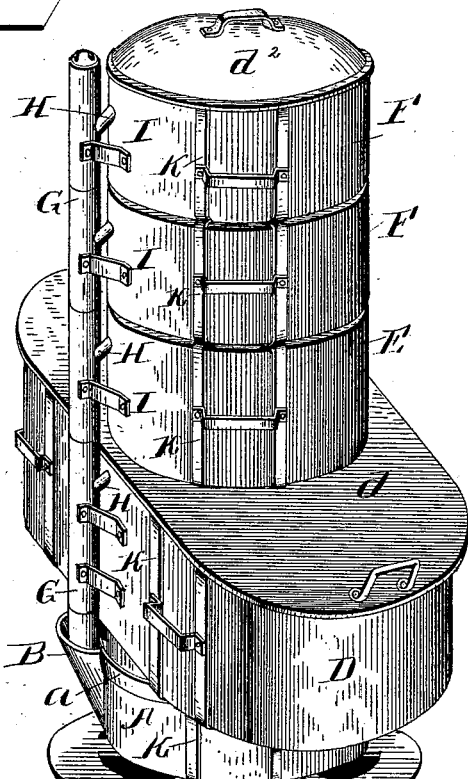
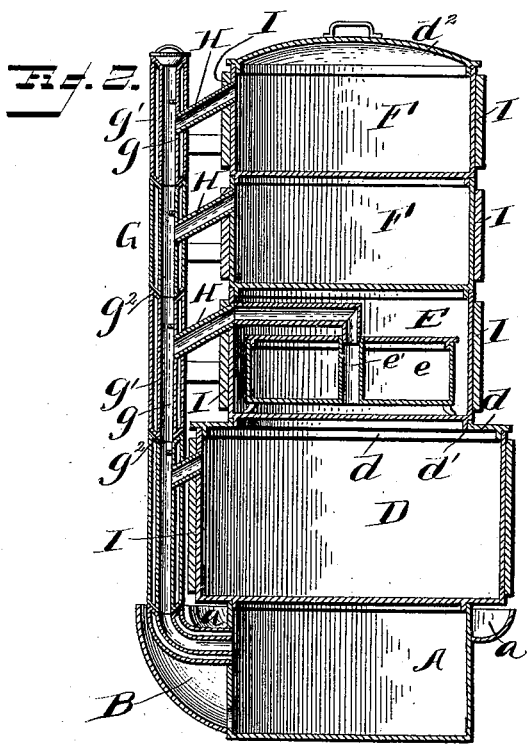
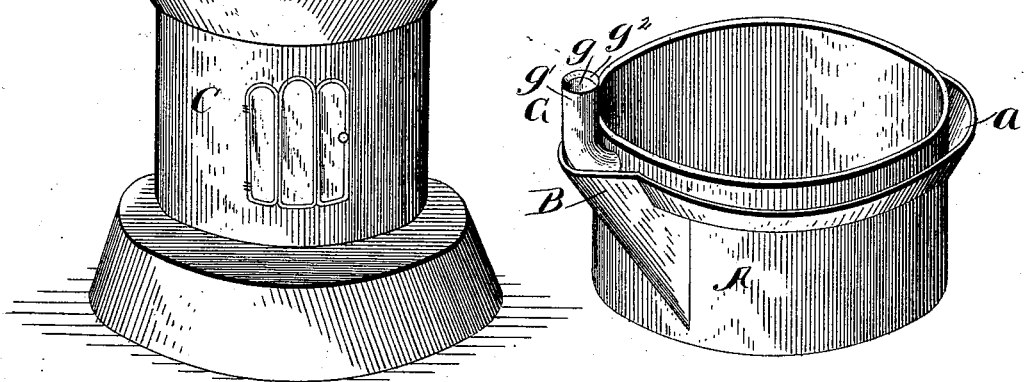
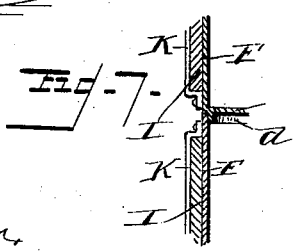
Witnesses
C. E. Hunt
M. J. McMahon
Inventor
James F. Tallant
By J. R. Littell
his Attorney
THE NATIONAL LITHOGRAPHING COMPANY,
WASHINGTON, D. C.

(No Model.)　　　　　　　　　　　　　　　　　　2 Sheets—Sheet 2.
J. F. TALLANT.
STEAM COOKER.
No. 512,339.　　　　　　　　　　　　Patented Jan. 9, 1894.
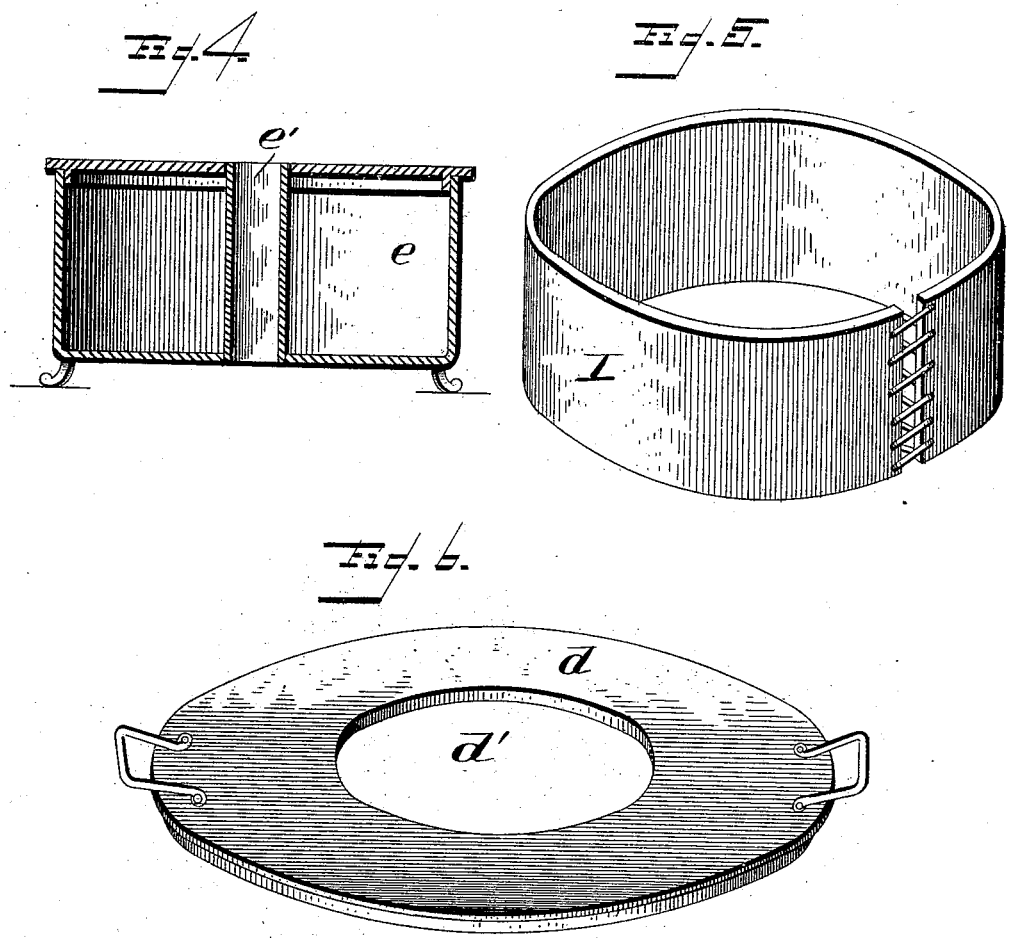

UNITED STATES PATENT OFFICE.

JAMES F. TALLANT, OF CHARLESTON, SOUTH CAROLINA.

STEAM-COOKER.

SPECIFICATION forming part of Letters Patent No. 512,339, dated January 9, 1894.

Application filed December 17, 1892. Serial No. 455,509. (No model.)

*To all whom it may concern:*

Be it known that I, JAMES F. TALLANT, a citizen of the United States, residing at Charleston, in the county of Charleston and State of South Carolina, have invented certain new and useful Improvements in Steam-Cookers; and I do hereby declare that the following is a full, clear, and exact description of the invention, which will enable others skilled in the art to which it appertains to make and use the same.

My invention relates to certain new and useful improvements in steam-cookers, and it consists in the novel construction and arrangement of parts hereinafter fully described and afterward definitely pointed out in the claims, due reference being had to the accompanying drawings forming a part of this specification, wherein—

Figure 1 is a perspective view of my improved steam-cooker. Fig. 2 is a vertical section of the same. Fig. 3 is a perspective view of the boiler. Fig. 4 is a vertical section of the bread and cake cooking vessel. Fig. 5 is a perspective view showing one of the asbestus jackets applied to one of the vessels, and Fig. 6 is a view of the cover to the roasting vessel. Fig. 7 is a detail sectional view of the strap on each vessel which is adapted to hold the asbestus jacket or shield in position.

Referring to said drawings, the letter A indicates the boiler consisting of a cylindrical vessel, around the top edge of which extends a flange $a$ forming a gutter. At one side, the boiler is provided with a spout B communicating with the boiler and by means of which water is introduced therein, the gutter $a$ communicating with said spout and catching and leading into said boiler any water of condensation that may drip down from the cooking vessels. The boiler A is adapted to be supported over any suitable heater, such as an oil lamp C.

D indicates the meat vessel which is preferably oblong and of a considerably greater size than the boiler in order that a turkey, large ham or roast may be cooked therein, and is provided with a cover $d$. The cover $d$ is provided with a central orifice $d'$ within which fits any one of the other vessels comprising the cooker, and when no one of said vessels is fitted in the orifice $d'$ said orifice is closed by means of a cover $d^2$. Resting upon the vessel D is a cake or bread vessel E, and F, F, indicate a series of cooking vessels arranged one upon another and resting upon the bread or cake vessel E. Connected to one side of the boiler and rising vertically therefrom is a sectional steam conduit G each section consisting of an inner and an outer tube $g$, $g'$, the lower end of each of the inner tubes $g$ being flared, as at $g^2$, to form a thimble adapted to seat over the upper end of the tube immediately below it and form a tight joint. Permanently connected to the tubes $g$ are branch tubes H which are detachable from and communicate with the cooking vessels and furnish the steam thereto from the boiler A. The tubes H are set at an upward incline to more readily convey the steam to the vessels, and to further insure this result, a semi-circular partition is provided in the tube $g$ above each branch tube. The steam conduit G being arranged directly above the filling spout B any water of condensation dripping from said conduit will drip into said spout and from thence into the boiler.

In order to prevent the escape of heat from the cooking vessels and to enable them to be handled without danger of burning the hands I surround each vessel with an asbestus jacket I, said vessels being provided with metallic loops or straps K, riveted or soldered to the sides of the vessels, through which the jacket is passed. If desired the jackets may be covered upon the outside with enameled cloth or other suitable material.

Any convenient form of handles may be secured to the loops K and serve as a means for lifting the vessels.

In practice any of the cooking vessels may be fitted one to the other according to the quantity and nature of the food to be cooked.

The bread or cake vessel E is provided with a pan $e$ through the center of which passes a tube $e'$ which is adapted to be connected with one of the branch pipes H, the lower end of the tube $e'$ opening beneath the bottom of the pan $e$, the pan resting upon suitable legs or supports. The pan may be provided with a cover. As thus constructed the steam passes through the center of the loaf and all around the same, greatly facilitating the cooking.

Having described my invention, what I claim is—

1. In a steam cooker the combination, with the cooking vessels seated one upon another, of the boiler provided at one side with a filling spout and at its top edge with a gutter communicating with said spout, and a sectional steam conduit connected with the boiler and communicating laterally with the cooking vessels by means of lateral upwardly inclined branch pipes; substantially as described.

2. In a steam cooker the combination, with the cooking vessels seated one upon another, of the boiler, and a sectional steam conduit consisting of an inner and an outer tube, the inner tube communicating with the boiler and by means of upwardly-inclined branch tubes detachably connected with the cooking vessels; substantially as described.

3. The combination, with a cooking vessel, of a removable asbestus jacket externally and concentrically surrounding the same, and loops or straps secured to said vessel and embracing said jacket; substantially as shown and described.

4. In a steam cooker, the combination, with the cooking vessels seated one upon another, of the oblong roasting vessel having an oval cover provided with a central orifice, said orifice being also provided with a cover and a superposed cooking vessel adapted to be seated in the central orifice in lieu of the said orifice cover; substantially as shown and described.

In testimony whereof I affix my signature in presence of two witnesses.

JAMES F. TALLANT.

Witnesses:
STEPHEN R. BELL,
T. L. BISSELL.